United States Patent
Iyengar et al.

(10) Patent No.: US 6,851,021 B2
(45) Date of Patent: Feb. 1, 2005

(54) METHODS AND SYSTEMS FOR EFFICIENTLY MANAGING PERSISTENT STORAGE

(75) Inventors: Arun Kwangil Iyengar, Yorktown Heights, NY (US); Shudong Jin, Malden, MA (US)

(73) Assignee: International Business Machines Corporation, Armonk, NY (US)

(*) Notice: Subject to any disclaimer, the term of this patent is extended or adjusted under 35 U.S.C. 154(b) by 109 days.

(21) Appl. No.: 09/921,820

(22) Filed: Aug. 3, 2001

(65) Prior Publication Data

US 2003/0028738 A1 Feb. 6, 2003

(51) Int. Cl.$^7$ .............................................. G06F 12/00
(52) U.S. Cl. ........................ 711/112; 711/170; 707/205
(58) Field of Search ................................ 711/112, 159, 711/170–172; 707/200, 202, 205

(56) References Cited

U.S. PATENT DOCUMENTS

| | | | |
|---|---|---|---|
| 5,268,019 A | * 12/1993 | Rathbone | 707/205 |
| 5,574,952 A | * 11/1996 | Brady et al. | 710/68 |
| 5,835,959 A | * 11/1998 | McCool et al. | 711/171 |
| 5,983,240 A | * 11/1999 | Shoroff et al. | 707/200 |
| 6,105,103 A | * 8/2000 | Courtright et al. | 711/1 |
| 6,446,183 B1 | * 9/2002 | Challenger et al. | 711/170 |

OTHER PUBLICATIONS

U.S. Appl. No. 09/504,064, filed Feb. 15, 2000, Challenger et al., "Systems and Methods for Persistent and Robust Memory Management."
U.S. Appl. No. 09/504,610, filed Feb. 15, 2000, Challenger et al., "System and Method for Persistent and Robust Storage Allocation."

* cited by examiner

Primary Examiner—Pierre M. Vital
(74) Attorney, Agent, or Firm—Rafael Perez-Pineiro; Ryan, Mason & Lewis, LLP

(57) ABSTRACT

A log of transactions is maintained on a persistent storage device. When a block of storage is allocated or deallocated, this transaction is recorded. If the persistent storage device is allowed to be slightly obsolete (i.e., not fully up-to-date), the log stored on the persistent storage device does not necessarily have to be updated right away. By delaying log updating until a certain number of transactions have transpired, memory seeks can be reduced, significantly improving performance. Further, directory information on the persistent storage device may be periodically updated from the log. This is preferably done infrequently enough so that the amortized cost for updating directory information is low.

21 Claims, 4 Drawing Sheets

METHODS AND SYSTEMS FOR EFFICIENTLY MANAGING PERSISTENT STORAGE

FIELD OF THE INVENTION

The present invention relates to data storage techniques and, more particularly, to techniques for efficiently managing the allocation/deallocation of persistent storage such as, for example, memory associated with a disk storage device.

BACKGROUND OF THE INVENTION

Many computer systems need to allocate/deallocate persistent storage during the course of the execution of various processes and applications handled by the computer systems. The term "persistent storage" refers to memory in which information stored therein is not lost when the device upon which the memory resides fails or is otherwise powered down. Memory which is persistent is also referred to as "non-volatile memory." One example of persistent storage is a disk storage device. Thus, information in persistent storage is expected to survive a system failure unlike information stored in memory which is not persistent such as, for example, most main memory associated with a computer system. Memory which is not persistent is also referred to as "volatile memory." One example of non-persistent storage is random access memory or RAM.

Conventional methods of storing information persistently include storage techniques associated with file systems and databases. As is known, the storage methods associated with such file systems and databases can be highly inefficient. The inefficiency of such conventional persistent storage techniques result in a high processing overhead. While file systems may have a lower overhead than databases, file system performance can be quite poor for file creation and file deletion. High overhead can also be a serious problem for persistent storage environments such as proxy caches on the World Wide Web, where data object creation and data object deletion constitute a significant fraction of request traffic.

There have been several solutions proposed for improving the known inefficiencies associated with persistent storage. For instance, the disk storage allocation approaches described in the U.S. patent application identified as Ser. No. 09/504,064, filed on Feb. 15, 2000, and entitled "Systems and Methods for Persistent and Robust Memory Management," and the U.S. patent application identified as Ser. No. 09/504,610, filed on Feb. 15, 2000, and entitled "System and Method for Persistent and Robust Storage Allocation," the disclosures of which are incorporated by reference herein, result in good performance when disk storage needs to be updated after every allocation or deallocation request. However, in situations where disk storage does not need to be updated after every allocation or deallocation request (i.e., when the situation dictates that the disk can be slightly out of date), the improved performance associated with these disk storage allocation approaches may not be realized.

Thus, there is a need for persistent storage techniques which address these inefficiency and overhead issues, as well as other related issues.

SUMMARY OF THE INVENTION

The present invention provides techniques for efficiently allocating persistent storage such as, for example, memory associated with a disk storage device. The invention is applicable to a broad range of applications including, but not limited to, disk storage for the World Wide Web, e.g., Web proxy caches and Web server systems. While the invention is particularly applicable to disk storage, it can be applied to other forms of persistent storage as well.

In one aspect of the invention, a log of transactions is maintained on a persistent storage device. When a block of storage is allocated or deallocated, this transaction is recorded. If the persistent storage device is allowed to be slightly obsolete (i.e., not fully up-to-date), the log stored on the persistent storage device does not necessarily have to be updated right away. By delaying log updating until a certain number of transactions have transpired, memory seeks can be reduced, significantly improving performance. Further, directory information on the persistent storage device may be periodically updated from the log. This is preferably done infrequently enough so that the amortized cost for updating directory information is low.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENT

While the present invention will be explained below with occasional reference to an illustrative World Wide Web or Internet-based environment, particularly with respect to disk storage associated with a Web server or a proxy caching server, it is to be understood that the present invention is not limited to such a particular environment or application. Rather, the invention is more generally applicable to any data storage environment or application in which it is desirable to substantially reduce overhead associated with the allocation/deallocation of persistent storage. That is, the techniques of the invention may be applied to any persistent storage systems such as disk storage systems or any other persistent memory-based devices such as, for example, ROM, fixed memory devices (e.g., hard drive), removable memory devices (e.g., diskette), etc.

It is to be understood that, as used herein with respect to data that may need to be persistently stored, the phrase "data object" is intended to refer to any storable data or information. By way of example only, in the context of the Web, a data object may be some form of Web data such as an HTML (HyperText Markup Language) file, an image file, etc. For example, the data may be objects that are retrieved on the Internet by a server system, or sent to a client computer operatively coupled to a server system via the Internet, in response to client requests. The data may also be objects created at the client's request. However, it is to be understood that the invention is not limited to any particular form of data or information.

Figure 1:
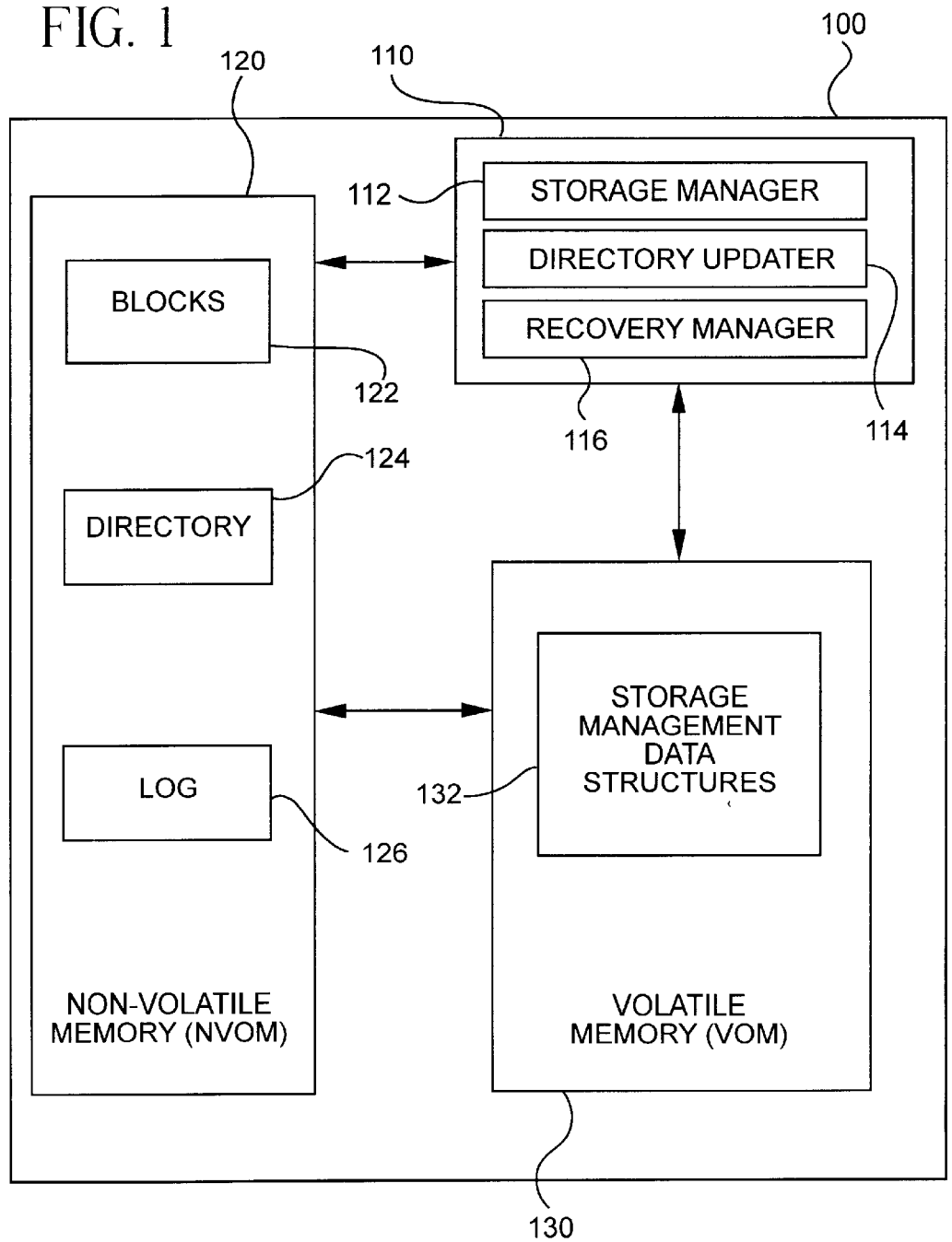
FIG. 1 is a block diagram illustrating a system capable of efficiently managing persistent storage in accordance with one embodiment of the present invention.

Referring initially to FIG. 1, a block diagram illustrates a system capable of efficiently managing persistent storage in accordance with one embodiment of the present invention. The system 100 may be used for efficiently storing Web data, although the system is not limited thereto. As shown, the system 100 comprises a memory management processing block 110, a non-volatile memory (NVOM) 120, and a volatile memory (VOM) 130, each being operatively coupled to the others. The management processing block 110, itself, comprises a storage manager 112, a directory updater 114, and a recovery manager 116. The NVOM 120, itself, comprises a plurality of blocks 122, a directory 124, and a log 126. The VOM 130 comprises at least one storage management data structure 132.

It is to be understood that in the illustrative embodiment of FIG. 1, the NVOM 120 of system 100 is a disk storage device. Such a disk storage device may be associated with a Web server system, such as a proxy caching system. Thus, in one embodiment, the management processing block 110 and the VOM 130 may be implemented with the processor/memory capacity of a Web server system, and the NVOM 120 may be the persistent storage associated with one or more disk storage devices used by the Web server system to persistently store Web data objects. Examples of server and proxy caching systems that may be employed to implement the system 100 are well known in the art. It is to be understood that the system 100 may, itself, comprise one or more server computer systems. Of course, in another embodiment, system 100 may be implemented independent of any server computer system such that the management processing block 110, NVOM 120, and VOM 130 are implemented on one or more dedicated computer systems with their own processor/memory capabilities.

It is to be appreciated that the term "processor" as used herein is intended to include any processing device, such as, for example, one that includes a CPU (central processing unit) or other processing circuitry. Also, the term "processor" may refer to one or more individual processors. Accordingly, one or more computer software programs including instructions or code for performing the persistent storage management methodologies of the invention, as described herein, may be stored in memory associated with the processor (e.g., ROM, fixed or removable memory) and, when ready to be utilized, loaded in part or in whole (e.g., into RAM) and executed by the processor so as to provide one or more of the benefits described herein.

As mentioned, NVOM 120 includes a plurality of blocks 122. These blocks are memory blocks used to satisfy requests for storage. In a Web environment, the request may be necessitated by a proxy server application. The directory 124 maintained in NVOM 120 persistently stores information about the plurality of blocks 122. For example, directory information may include, for each of the plurality of blocks: (i) the address of the block; (ii) the size of the block; and (iii) the allocation status of the block.

Figure 2:
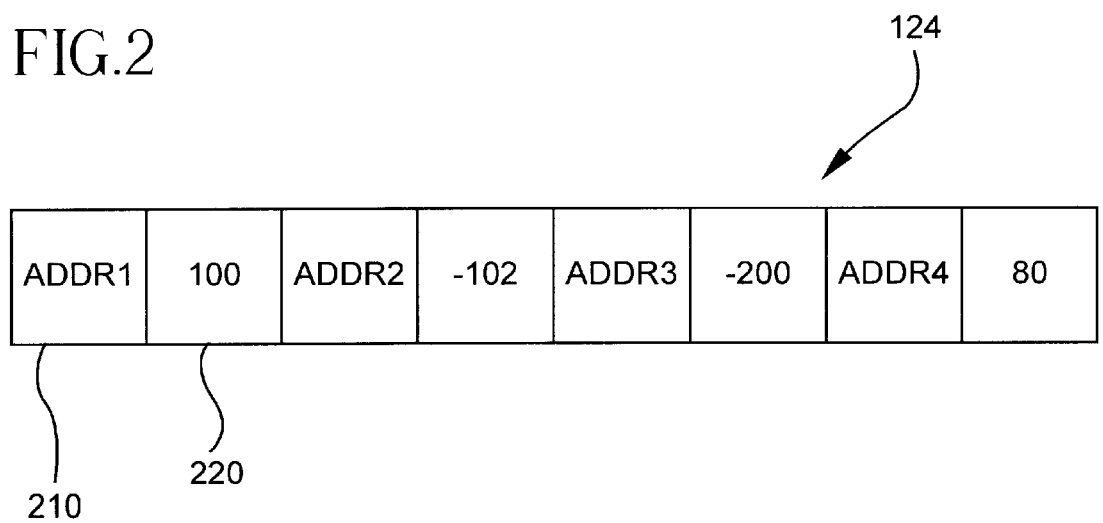
FIG. 2 is a diagram illustrating a directory in accordance with one embodiment of the present invention.

FIG. 2 is a diagram illustrating the directory 124 in accordance with one embodiment of the present invention. As shown, the directory maintains the information about the blocks in fields. Field 210 contains the address of a block, while field 220 contains the size and allocation status of a block. For example, "ADDR1" represents the address of a block, its size is 100, and the fact that the size is positive indicates that the block is unallocated or free to be allocated. Further, "ADDR2" represents the address of another block, its size is 102, and the fact that the size is negative indicates that the block is allocated or not free to be allocated. It is to be understood that various other representations of the directory are contemplated by the present invention and the representation in FIG. 2 is intended to serve as an illustrative example.

Entries comprising the directory are preferably (but not necessarily) maintained in close proximity to each other in the NVOM. That way, when a directory needs to be updated from a log, as will be explained, the number of NVOM or disk seeks for updating the directory is not excessively high. The entire directory 124 may preferably be maintained contiguously in NVOM 120.

Figure 3:
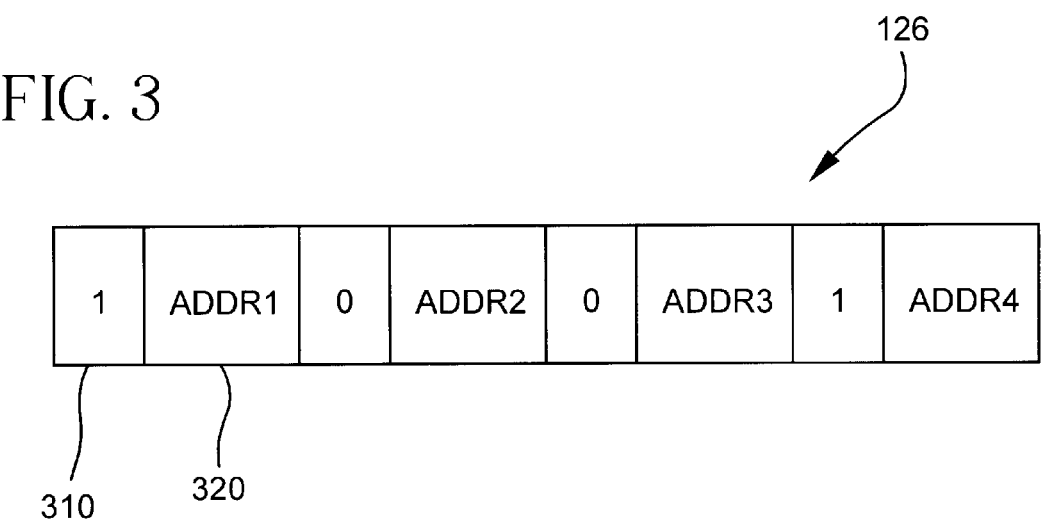
FIG. 3 is a diagram illustrating a log in accordance with one embodiment of the present invention.

As mentioned, the system 100 also includes a log 126 stored in the NVOM 120. The log records storage management requests persistently. FIG. 3 is a diagram illustrating a log in accordance with one embodiment of the present invention. As shown, the log maintains information about storage management requests in fields. Field 310 contains the type of allocation request (i.e., allocate or deallocate) for a subject block of the plurality of blocks 122, while field 320 contains the address of a subject block. For example, the first request, "1 ADDR1," is a request to deallocate (indicated by a value of one in field 310) the block whose address is ADDR1. By deallocate, it is meant to free the block for subsequent use (i.e., the block is no longer reserved and can be written over). The second request, "0 ADDR2," is a request to allocate (indicated by a value of zero in field 310) the block whose address is ADDR2. By allocate, it is meant to designate the block for subsequent use (i.e., such that the block is reserved to satisfy the present request and another request is not free to use that block until the block is deallocated). It is to be understood that various other representations of the log are contemplated by the present invention and the representation in FIG. 3 is intended to serve as an illustrative example. In addition, the number of different request types may be larger than two.

Referring back to the management processing block 110, the storage manager 112 is the component which allocates and deallocates blocks 122, and which periodically updates the log 126 from the VOM 130. The directory updater 114 periodically updates directory information 124 from log 126. As shown, the system 100 also includes a recovery manager 116 for recovering the system 100 from a failure. For example, the recovery manager 116 may attempt to recover as much of the state of the system as possible from at least one log.

It is to be understood that the invention is not intended to be limited to the division of components 112, 114, and 116, as illustrated in FIG. 1. For example, it is possible to integrate combinations of these components (e.g., a single unified directory updater and storage manager, integrated storage manager encompassing 112, 114, and 116, etc.) or break up their functionality differently. As mentioned above, the components 112, 114, and 116 may be implemented in accordance with the processing capabilities of a server computer system upon which they reside or, in the case where the system 100 is a dedicated memory system, with the processing capabilities of the dedicated computer system.

Figure 4A:
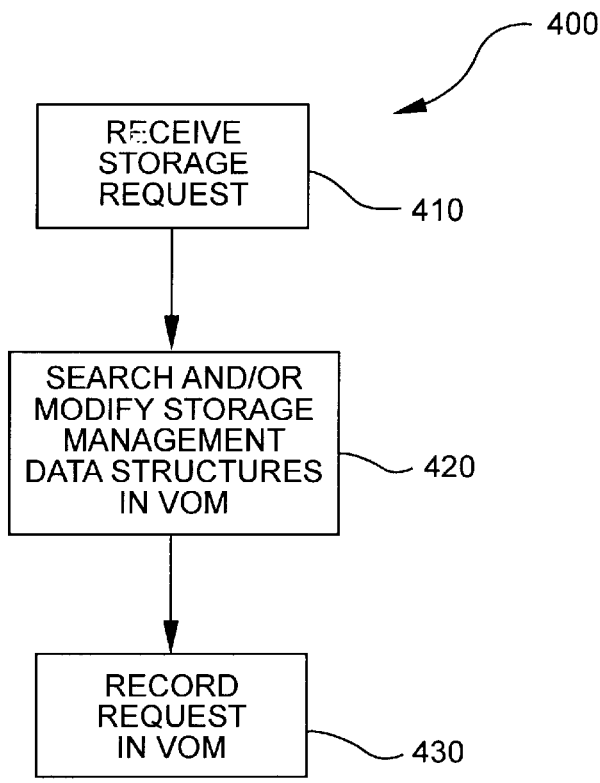
FIG. 4A is a flow diagram illustrating a method of satisfying an allocation or deallocation request in accordance with one embodiment of the present invention.

Referring now to FIG. 4A, a flow diagram illustrates a method of satisfying an allocation or deallocation request in accordance with one embodiment of the present invention. More specifically, FIG. 4A depicts a method for handling storage requests in accordance with the invention. The method will be described below with reference back to the components of system 100 of FIG. 1.

In step 410, a persistent storage request is received by the storage manager 112 of the system 100. Again, the request may be made from a portion of a Web server handling a client query. In step 420, the storage management data structures 132 of the VOM 130 are searched and/or modified in accordance with the received request. For example, if the request is an allocation request, an appropriate block is located from the storage management data structures 132 maintained in VOM. An appropriate block may be one which is large enough to satisfy the request. Again, the storage manager 112 preferably performs this function. In step 430, enough information is updated in VOM to record the request. For example, storage management data structures 132 may be updated by the storage manager 112. Such data structures may include information about allocation status of one or more blocks, one or more free lists, a VOM copy of at least part of a log, or possibly other information.

It is to be appreciated that the steps in the process of FIG. 4A (steps 410, 420, and 430) do not necessitate any NVOM accesses. As is known, NVOM access adds to the overhead expense. If the NVOM is allowed to be slightly obsolete, the NVOM log does not have to be updated immediately. This can improve performance considerably. The drawback is that in the event of a system failure, updates not flushed to (not written to) NVOM might be lost.

Figure 4B:
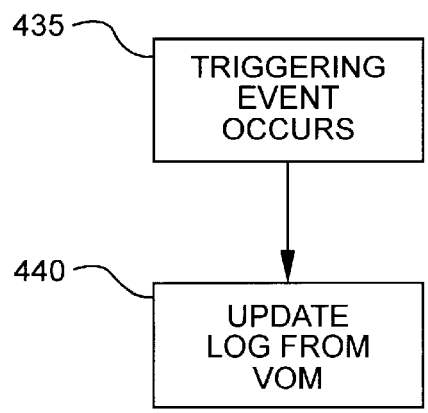
FIG. 4B is a flow diagram illustrating a method of updating a log in accordance with one embodiment of the present invention.

Referring now to FIG. 4B, a flow diagram illustrates a method of updating a log in accordance with one embodiment of the present invention. It is to be understood that the storage manager 112 preferably periodically updates the log 126 in the NVOM 120 from the data structures 132 of the VOM 130. Thus, as shown in step 435 of FIG. 4B, an update triggering event occurs. Then, in step 440, log 126 is updated from information stored in the VOM 130. One method for updating the log 126 is to perform the update after every n requests (where n is a positive integer). Thus, receipt of n requests is the update triggering event. Larger values of n mean fewer NVOM accesses and thus lower overhead. Smaller values of n mean more log updates and, on average, less data lost in the event of a system failure. It is to be understood that other methods of periodically performing step 440 are contemplated by the present invention.

Figure 5:
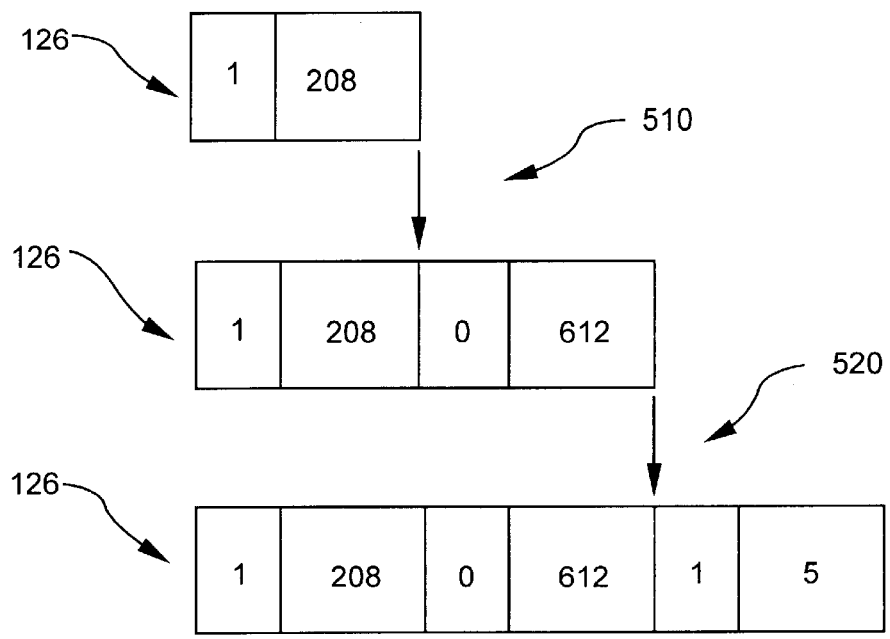
FIG. 5 is a diagram illustrating an example of updating a log in accordance with one embodiment of the present invention.

FIG. 5 is a diagram illustrating an example of updating a log in accordance with one embodiment of the present invention. The log illustrated in FIG. 5 is in a similar structure as that illustrated and described above in the context of FIG. 3. That is, the first field indicates a value of one to denote a deallocation request or zero to denote an allocation request, while the second field is the address of the subject block. As shown initially, the log contains an entry for a block with address 208 and the indication that a request to deallocate the block has been received ("1 208"). Next, it is assumed that a request to allocate a block with address 612 has been received. Thus, in step 510, the log is updated by adding an entry to reflect the request ("0 612"). Lastly, it is assumed that a request to deallocate a block with address 5 has been received. Thus, in step 520, the log is updated by adding an entry to reflect the request ("1 5").

Figure 4C:
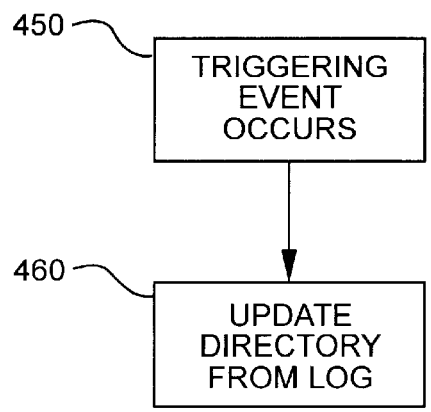
FIG. 4C is a flow diagram illustrating a method of updating a directory from a log in accordance with one embodiment of the present invention.

Referring now to FIG. 4C, a flow diagram illustrates a method of updating a directory from a log in accordance with one embodiment of the present invention. It is to be understood that the directory updater 114 preferably periodically updates the directory 124 in the NVOM 120 from the log 126 in the NVOM 120. Thus, as shown in step 450 of FIG. 4C, an update triggering event occurs. Then, in step 460, directory 124 is updated from log 126. The system preferably uses efficient techniques for performing step 460. For example, in a disk-based NVOM system, in order to reduce the number of disk seeks, the system may update a directory sector by making all of the updates to a copy of the sector in VOM. The system then flushes (writes) the copy of the sector with all updates to disk. That way, the same directory sector is not written out to disk twice. Step 460 may also optimize storage and retrieval of multiple directory sectors.

In many cases, buffered copies of log entries needed to update the directory in VOM may be maintained. The log entries may be processed to remove superfluous entries to minimize unnecessary directory updates. For example, if the status of a block b1 changes in the log several times, but the net effect is that the directory entry for b1 should not change, then the system may ignore all requests associated with b1.

As mentioned, step 460 is performed periodically. One method for accomplishing this is to perform step 460 after every n requests (where n is a positive integer). Thus, again, receipt of n requests is the triggering event. Step 460 may also be performed after recovery from a system failure. Various other methods for invoking step 460 periodically are contemplated by the present invention.

One optimization for disk-based NVOM which can be implemented to reduce the overhead of step 460 is to attempt to perform allocations which do not increase the number of disk accesses during step 460. For example, suppose that directory information is contained in sectors b1, b2, and b3 of a disk. Assume that the system 100 knows that sector b1 will have to be updated at the next application of step 460 because it has changed, but b2 may not have to be updated because it has not changed yet. When the system receives a request for a free block in step 410, the system may try to satisfy the request, in step 420, by a block whose directory information is in b1 instead of b2.

Figure 6:
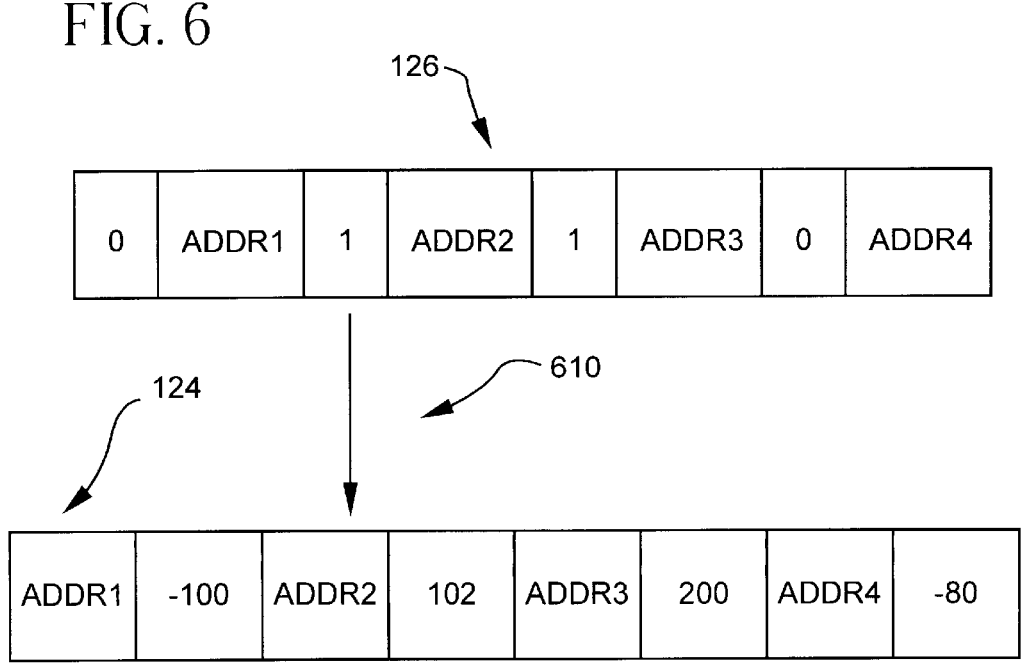
FIG. 6 is a diagram illustrating an example of updating a directory from a log in accordance with one embodiment of the present invention.

FIG. 6 is a diagram illustrating an example of updating a directory from a log in accordance with one embodiment of the present invention. The log 126 illustrated in FIG. 6 is in a similar structure as that illustrated and described above in the context of FIG. 3. That is, the first field indicates a value of one to denote a deallocation request or zero to denote an allocation request, while the second field is the address of the subject block. Likewise, the directory 124 being updated in FIG. 6 is the same directory as that illustrated in FIG. 2. For each directory entry, the first field contains the address of each block, while the second field contains the size and allocation status of each block (negative block size meaning that the block is allocated and is therefore not free, and a positive block size meaning that the block is deallocated and therefore free).

Thus, assuming the log 126 as shown in FIG. 6, step 610 (which corresponds to step 460 of FIG. 4C) updates the directory 124 from FIG. 2 to the state shown in FIG. 6. By way of example, the log indicates that a request to allocate the block with address ADDR1 has been received ("0 ADDR1"). Thus, when the directory is updated, the entry for ADDR1 indicates the size of the block with a negative sign to reflect that the block is not free ("ADDR1-100"). It is evident from this example how ADDR2, ADDR3 and ADDR4 are updated in the directory by the information persistently stored in the log.

After a directory is updated from a log, it may be desirable to delete all or part of the log, e.g., to save storage.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. In accordance with a computer system comprising a volatile memory and a non-volatile memory, a method of managing a plurality of blocks in the non-volatile memory, comprising the steps of:

maintaining, in the non-volatile memory, a directory of information for each of the plurality of blocks;

maintaining at least one data structure in the volatile memory for managing the plurality of blocks;

allocating a block by: (a) identifying the block by employing the at least one data structure in the volatile memory; and (b) recording an allocation request for the block in the volatile memory;

periodically updating a log in the non-volatile memory, wherein the log comprises a plurality of allocation requests, with at least one additional allocation request recorded in the volatile memory; and periodically updating the directory from the log.

2. The method of claim 1, further comprising the step of recording a deallocation request in the volatile memory.

3. The method of claim 1, further comprising the step of updating the directory from the log after a system failure.

4. The method of claim 1, wherein the directory of information for a block comprises at least one of an allocation status and a size.

5. The method of claim 1, wherein the directory of information is maintained in close proximity or contiguously within the non-volatile memory.

6. The method of claim 1, wherein the non-volatile memory comprises at least one disk storage device.

7. The method of claim 1, wherein the volatile memory comprises main memory.

8. The method of claim 1, wherein the directory of information is updated from the log after n requests, where n is a positive integer.

9. The method of claim 1, wherein the log is updated from the volatile memory after n requests, where n is a positive integer.

10. A data storage system, the system comprising:

a non-volatile memory, the non-volatile memory comprising a plurality of blocks;

a volatile memory, the volatile memory comprising at least one data structure for managing the plurality of blocks;

at least one processor, coupled to the non-volatile memory and the volatile memory, operative to: (i) maintain, in the non-volatile memory, a directory of information for each of the plurality of blocks; (ii) maintain the at least one data structure in the volatile memory; (iii) allocate a block by identifying the block via the at least one data structure in the volatile memory, and recording an allocation request for the block in the volatile memory; (iv) periodically update a log in the non-volatile memory, wherein the log comprises a plurality of allocation requests, with at least one additional allocation request recorded in the volatile memory; and (v) periodically update the directory from the log.

11. The system of claim 10, wherein the at least one processor is further operative to record a deallocation request in the volatile memory.

12. The system of claim 10, wherein the at least one processor is further operative to update the directory from the log after a system failure.

13. The system of claim 10, wherein the directory of information for a block comprises at least one of an allocation status and a size.

14. The system of claim 10, wherein the directory of information is maintained in close proximity or contiguously within the non-volatile memory.

15. The system of claim 10, wherein the non-volatile memory comprises at least one disk storage device.

16. The system of claim 10, wherein the volatile memory comprises main memory.

17. The system of claim 10, wherein the directory of information is updated from the log after n requests, where n is a positive integer.

18. The system of claim 10, wherein the log is updated from the volatile memory after n requests, where n is a positive integer.

19. The system of claim 10, wherein the at least one processor is further operative to recover from a system failure.

20. In accordance with a computer system comprising a volatile memory and a non-volatile memory, an article of manufacture for managing a plurality of blocks in the non-volatile memory, comprising a machine readable medium containing one or more programs which when executed implement the steps of:

maintaining, in the non-volatile memory, a directory of information for each of the plurality of blocks;

maintaining at least one data structure in the volatile memory for managing the plurality of blocks;

allocating a block by: (a) identifying the block by employing the at least one data structure in the volatile memory; and (b) recording an allocation request for the block in the volatile memory;

periodically updating a log in the non-volatile memory, wherein the log comprises a plurality of allocation requests, with at least one additional allocation request recorded in the volatile memory; and periodically updating the directory from the log.

21. In accordance with a computer system comprising a volatile memory and a non-volatile memory, a method of managing a plurality of blocks in the non-volatile memory, comprising the steps of:

maintaining, in the non-volatile memory, a directory of information for each of the plurality of blocks;

maintaining at least one data structure in the volatile memory for managing the plurality of blocks;

allocating a block in non-volatile memory by: (a) identifying the block by employing the at least one data structure in the volatile memory; and (b) recording an allocation request for the block in the volatile memory;

periodically updating a log in the non-volatile memory from the volatile memory; and periodically updating the directory from the log.

* * * * *

UNITED STATES PATENT AND TRADEMARK OFFICE
CERTIFICATE OF CORRECTION

PATENT NO. : 6,851,021 B2
DATED : February 1, 2005
INVENTOR(S) : A.K. Iyengar et al.

It is certified that error appears in the above-identified patent and that said Letters Patent is hereby corrected as shown below:

Title page,
Item [56], References Cited, U.S. PATENT DOCUMENTS, delete
"5,268,019 * 12/1993 Rathbone …………….. 707/205" and insert
-- 5,269,019 * 12/1993 Peterson et al. …………… 707/205 --

Signed and Sealed this

Twenty-second Day of March, 2005

JON W. DUDAS
*Director of the United States Patent and Trademark Office*